(12) United States Patent
Wang et al.

(10) Patent No.: US 10,514,446 B1
(45) Date of Patent: Dec. 24, 2019

(54) SYSTEM AND METHODS FOR CONTROLLING MICRO-MIRROR ARRAY

(71) Applicant: DiDi Research America, LLC, Mountain View, CA (US)

(72) Inventors: Youmin Wang, Mountain View, CA (US); Qin Zhou, Mountain View, CA (US)

(73) Assignee: DiDi Research America, LLC, Mountain View, CA (US)

( * ) Notice: Subject to any disclaimer, the term of this patent is extended or adjusted under 35 U.S.C. 154(b) by 0 days.

(21) Appl. No.: 16/214,001

(22) Filed: Dec. 7, 2018

(51) Int. Cl.
*G01S 7/48* (2006.01)
*G01S 7/481* (2006.01)
*G01S 17/93* (2006.01)
*G05D 1/02* (2006.01)

(52) U.S. Cl.
CPC .......... *G01S 7/4817* (2013.01); *G01S 17/936* (2013.01); *G05D 1/0231* (2013.01)

(58) Field of Classification Search
CPC ..... G02B 26/0841; H04N 9/3129; G01B 7/14
See application file for complete search history.

(56) References Cited

U.S. PATENT DOCUMENTS

| 9,835,853 B1 * | 12/2017 | Shpunt | G02B 26/105 |
| 2004/0141682 A1 | 7/2004 | Mori | |
| 2004/0223195 A1 | 11/2004 | Nomura | |
| 2014/0062506 A1 * | 3/2014 | Defazio | G02B 26/0841 324/658 |
| 2015/0077823 A1 | 3/2015 | Hashiguchi et al. | |
| 2016/0170202 A1 | 6/2016 | Yasuda | |
| 2016/0238834 A1 | 8/2016 | Erlich et al. | |
| 2017/0153445 A1 | 6/2017 | Gerson et al. | |
| 2018/0329204 A1 * | 11/2018 | Smits | G02B 26/105 |

FOREIGN PATENT DOCUMENTS

CN        106066535 A        11/2016

OTHER PUBLICATIONS

PCT/US2018/065043, "International Search Report and Written Opinion", dated Feb. 4, 2019, 10 pages.

* cited by examiner

*Primary Examiner* — Luke D Ratcliffe
(74) *Attorney, Agent, or Firm* — Kilpatrick Townsend & Stockton LLP

(57) ABSTRACT

Systems and methods for operating an array of micro-mirror assemblies are provided. In one example, an apparatus comprises: a light source; a receiver; and a semiconductor integrated circuit comprising a microelectromechanical system (MEMS) and a controller, the MEMS comprising an array of micro-mirror assemblies, each micro-mirror assembly comprising: a micro-mirror connected to a substrate of the semiconductor integrated circuit via an elastic connection structure and rotatable around the connection structure to perform at least one of: reflect light from the light source along an output projection path, or reflect input light propagating along an input path to the receiver. The controller is configured to generate a control signal to rotate the micro-mirrors based on a target rotation angle and a spring stiffness of one or more connection structures of the array of micro-mirror assemblies.

15 Claims, 13 Drawing Sheets

SYSTEM AND METHODS FOR CONTROLLING MICRO-MIRROR ARRAY

CROSS-REFERENCES TO RELATED APPLICATIONS

The following eight U.S. patent applications listed below (which includes the present application) are being filed concurrently, and the entire disclosures of the other applications are incorporated by reference into this application for all purposes:

application Ser. No. 16/213,990, filed Dec. 7, 2018, entitled "MULTI-THRESHOLD LIDAR DETECTION";

application Ser. No. 16/213,992 filed Dec. 7, 2018, entitled "MIRROR ASSEMBLY FOR LIGHT STEERING";

application Ser. No. 16/214,010, filed Dec. 7, 2018, entitled "COUPLED AND SYNCHRONOUS MIRROR ELEMENTS IN A LIDAR-BASED MICRO-MIRROR ARRAY;

application Ser. No. 16/214,013, filed Dec. 7, 2018, entitled "COUPLED AND SYNCHRONOUS MIRROR ELEMENTS IN A LIDAR-BASED MICRO-MIRROR ARRAY;

application Ser. No. 16/213,995, filed Dec. 7, 2018, entitled "NON-LINEAR SPRINGS TO UNIFY THE DYNAMIC MOTION OF INDIVIDUAL ELEMENTS IN A MICRO-MIRROR ARRAY";

application Ser. No. 16/213,997, filed Dec. 7, 2018, entitled "NON-LINEAR SPRINGS TO UNIFY THE DYNAMIC MOTION OF INDIVIDUAL ELEMENTS IN A MICRO-MIRROR ARRAY";

application Ser. No. 16/213,999, filed Dec. 7, 2018, entitled "A LEVER SYSTEM FOR DRIVING MIRRORS OF A LIDAR TRANSMITTER"; and application Ser. No. 16/214,001, filed Dec. 7, 2018, entitled "SYSTEM AND METHODS FOR CONTROLLING MICRO-MIRROR ARRAY".

BACKGROUND

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc.

Light steering can be performed in both transmission and reception of light. For example, a light steering transmitter may include a micro-mirror array to control the projection direction of light to detect/image an object. Moreover, a light steering receiver may also include a micro-mirror array to select a direction of incident light to be detected by the receiver, to avoid detecting other unwanted signals. The micro-mirror array may include an array of micro-mirror assemblies, with each micro-mirror assembly comprising a micro-mirror and an actuator. In a micro-mirror assembly, a mirror-mirror can be connected to a substrate via a connection structure (e.g., a torsion bar, a spring, etc.) to form a pivot, and the micro-mirror can be rotated around the pivot by the actuator. Each micro-mirror can be rotated by a rotation angle to reflect (and steer) light from a light source towards a target direction. Each micro-mirror can be rotated by the actuator to provide a first range of angles of projection along a vertical axis and to provide a second range of angles of projection along a horizontal axis. The first range and the second range of angles of projection can define a two-dimensional field of view (FOV) in which light is to be projected to detect/scan an object. The FOV can also define the direction of incident lights, reflected by the object, are to be detected by the receiver.

Typically each micro-mirror assembly of a micro-mirror array is identical, and the micro-mirror in each micro-mirror assembly can be controlled to rotate uniformly by the same control signal. However, due to precision limitations in the fabrication process, there can be component variations among the micro-mirror assemblies which can degrade the uniformity of the rotations among the micro-mirrors. It is desirable to adapt the control signals for different micro-mirror assemblies to account for the component variations, to improve the uniformity of rotations among the micro-mirrors.

BRIEF SUMMARY

In certain embodiments, an apparatus is provided. The apparatus can be part of a Light Detection and Ranging (LiDAR) module of a vehicle and comprising: a light source; a receiver; and a semiconductor integrated circuit comprising a microelectromechanical system (MEMS) and a controller. The MEMS may include an array of micro-mirror assemblies, each micro-mirror assembly comprising: a micro-mirror connected to a substrate of the semiconductor integrated circuit via an elastic connection structure and rotatable around the connection structure to perform at least one of: reflect light from the light source along an output projection path, or reflect input light propagating along an input path to the receiver, and an actuator controllable by the controller to rotate the micro-mirror. The controller is configured to: determine a target rotation angle for each micro-mirror assembly of the array of micro-mirror assemblies to set a target direction of at least one of the output projection path or the input path. For the each micro-mirror assembly, the controller can generate a control signal for the actuator of the each micro-mirror assembly based on the target rotation angle and a spring stiffness of one or more connection structures of the array of micro-mirror assemblies, and transmit the control signal to the actuator of the each micro-mirror assembly to rotate the micro-mirror of the each micro-mirror assembly by the target rotation angle.

In some aspects, the controller is configured to, for the each micro-mirror assembly, generate the control signal for the actuator of the each micro-mirror assembly based on the target rotation angle and the spring stiffness of the connection structure of the each micro-mirror assembly.

In some aspects, the array of micro-mirror assemblies comprises a plurality of sections. The controller is configured to for the each micro-mirror assembly, generate the control signal for the actuator of the each micro-mirror assembly based on the target rotation angle and the spring stiffness of a connection structure of a representative micro-mirror assembly of a section in which the micro-mirror assembly is located.

In some aspects, the connection structure of the each micro-mirror assembly comprises at least one of: a torsion bar, or a spring. The connection structure is configured such that one dimension dominates the spring stiffness of the connection structure. The controller is configured to generate the control signal based on an electrical resistance related to the one dimension of the one or more connection structures.

In some aspects, the controller comprises a control signal generation module and a control signal adjustment module.

The control signal generation module is configured to generate a first signal based on the target rotation angle. The control signal adjustment module is configured to adjust the first signal based on the electrical resistance to generate the control signal. In some aspects, the one dimension is a thickness of the connection structure perpendicular to a surface of the micro-mirror of the each micro-mirror assembly. The control signal adjustment module can adjust the first signal based on a ratio between the electrical resistance and a reference resistance representing a nominal spring stiffness of the one or more connection structures.

In some aspects, the control signal adjustment module comprises a square-root generation circuit. The square-root generation circuit configured to perform a square-root operation on the control signal and transmit the square-rooted control signal to the actuator of the each micro-mirror assembly. The actuator of the each micro-mirror assembly comprises an electrostatic actuator.

In some aspects, a first connection structure of the one or more connection structures comprises a first electrical contact and a second electrical contact separated by a length of the connection structure perpendicular to the thickness. The control signal adjustment module comprises an amplifier and a reference resistor, the reference resistor having a resistance representing a nominal spring stiffness of the one or more connection structures. The first electrical contact is configured to receive the first signal. The second electrical contact is connected to a negative input terminal of the amplifier. The reference resistor is connected across the negative input terminal and an output terminal of the amplifier. The control signal is obtained from the output terminal of the amplifier.

In some aspects, a first connection structure of the one or more connection structures comprises a first electrical contact and a second electrical contact separated by the thickness. The control signal adjustment module comprises an amplifier and a reference resistor, the reference resistor having a resistance representing a nominal spring stiffness of the one or more connection structures. The reference resistor is configured to receive the first signal and transmit the first signal to a negative input terminal of the amplifier. The first electrical contact is connected to the negative input terminal of the amplifier. The second electrical contact is connected to an output terminal of the amplifier. The control signal is obtained from the output terminal of the amplifier.

In some aspects, the control signal adjustment module comprises a current source, an analog-to-digital converter (ADC), a set of switches, a set of registers, a computation module, and a digital-to-analog converter (DAC). The control signal adjustment module is configured to: control the set of switches to connect the connection structure of the each micro-mirror assembly to the current source sequentially to generate a voltage; control the ADC to digitize the voltages; store the digitized voltages at the set of registers to create a voltage map that maps the digitized voltages to the array of micro-mirror assemblies; control the computation module to compute, based on the voltage map and the first signal, the control signals in digital form for the actuators of the array of micro-mirror assemblies; generate the control signals in analog form from the digital forms using the DAC; and transmit the control signals in analog form to the actuators.

In some aspects, the control signal adjustment module is configured to generate the voltage map in a calibration process before the array of micro-mirror assemblies receive the light.

In some embodiments, a method is provided. The method comprises determining a target rotation angle for each mirror-mirror assembly of an array of mirror-mirror assemblies to set a target direction of at least one of: a projection path of output light from a light source, or an input path of input light to be received by a receiver; for the each micro-mirror assembly, generating a control signal for an actuator of the each micro-mirror assembly based on the target rotation angle and a spring stiffness of one or more connection structures of the array of micro-mirror assemblies; and transmitting the control signal to the actuator of the each micro-mirror assembly to rotate the micro-mirror of the each micro-mirror assembly by the target rotation angle, to perform at least one of: reflecting the output light of the light source along the projection path towards an object, or reflecting the input light propagating along the input path to the receiver.

In some aspects, the one or more connection structures is configured such that one dimension dominates the spring stiffness. The control signal is generated based on an electrical resistance related to the one dimension of the one or more connection structures.

In some aspects, the method further comprises: receiving an input signal corresponding to the target rotation angle; and scaling, by an amplifier, the input signal based on a ratio between the electrical resistance and a reference resistance representing a nominal spring stiffness of the one or more connection structures to generate the control signal.

In some aspects, the method further comprises passing the input signal through two electrical contacts positioned on the one or more connection structure to the amplifier to perform the scaling. In some aspects, the method further comprises passing the input signal through a resistor having the reference resistance to the amplifier to perform the scaling.

In some aspects, the method further comprises: measuring the electrical resistance using an analog-to-digital converter to generate a measurement result; receiving an input signal in digital format corresponding to the target rotation angle; scaling the input signal in digital format based on the measurement result; and generating, using a digital-to-analog converter and based on the scaled input signal in digital format, the control signal.

In some aspects, the method further comprises: measuring the electrical resistance of the one or more connection structures of the each micro-mirror assembly to generate a set of measurement results; storing the set of measurement results in a register; and generating the control signal for the each micro-micro assembly based on the set of measurement results in the register.

BRIEF DESCRIPTION OF THE DRAWINGS

The detailed description is set forth with reference to the accompanying figures.

DETAILED DESCRIPTION

Figure 1:
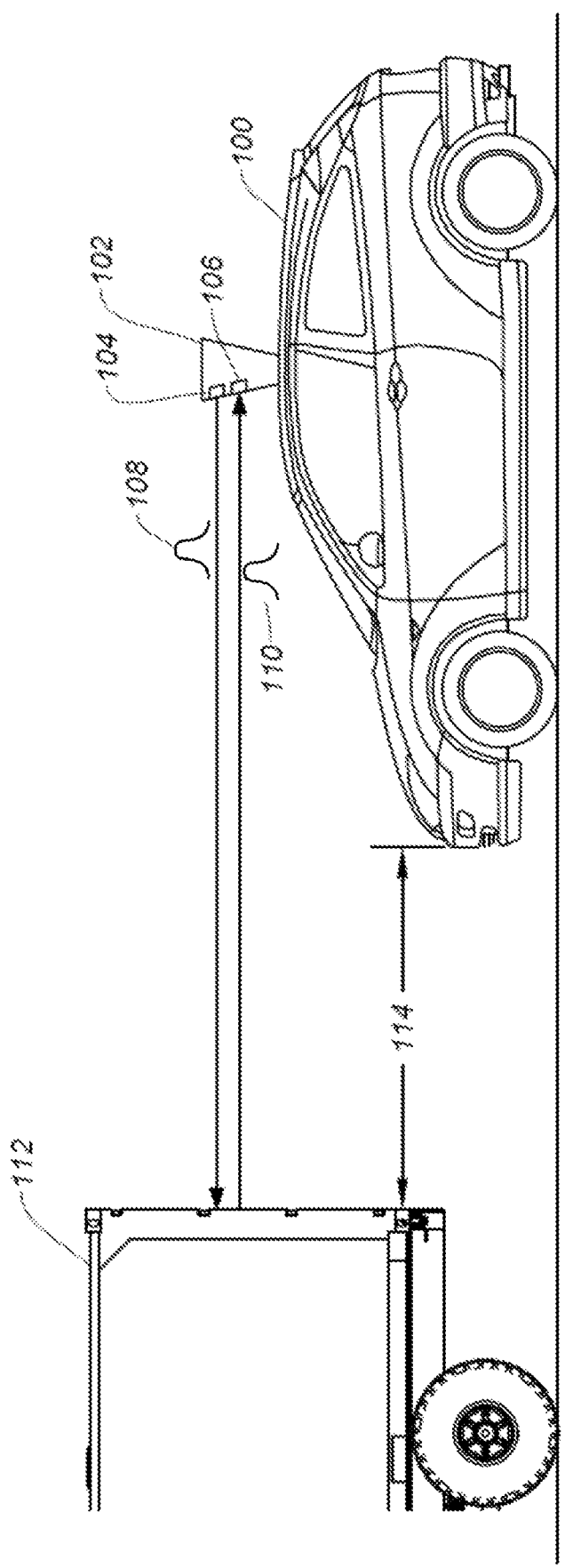
FIG. 1 shows an autonomous driving vehicle utilizing aspects of certain embodiments of the disclosed techniques herein.

In the following description, various examples of an adaptive control system of a micro-mirror array will be described. The adaptive control system can adjust the control signals for each micro-mirror of the array to account for the component variations among the micro-mirrors and to improve the uniformity of rotations among the micro-mirrors. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Light steering can be found in different applications. For example, a Light Detection and Ranging (LiDAR) module of a vehicle may include a light steering system. The light steering system can be part of a transmitter to steer light towards different directions to detect obstacles around the vehicle and to determine the distances between the obstacles and the vehicle, which can be used for autonomous driving. Moreover, a receiver may also include a micro-mirror array to select a direction of incident light to be detected by the receiver, to avoid detecting other unwanted signals. Further, the head light of a manually-driven vehicle can include the light steering transmitter, which can be controlled to focus light towards a particular direction to improve visibility for the driver. In another example, optical diagnostic equipment, such as an endoscope, can include a light steering transmitter to steer light in different directions onto an object in a sequential scanning process to obtain an image of the object for diagnosis.

Light steering can be implemented by way of a micro-mirror array. The micro-mirror array can have an array of micro-mirror assemblies, with each micro-mirror assembly having a movable micro-mirror and an actuator (or multiple actuators). The micro-mirrors and actuators can be formed as microelectromechanical systems (MEMS) on a semiconductor substrate which allows integration of the MEMS with other circuitries (e.g., controller, interface circuits, etc.) on the semiconductor substrate. In a micro-mirror assembly, a mirror-mirror can be connected to the semiconductor substrate via a connection structure (e.g., a torsion bar, a spring, etc.) to form a pivot. The actuator can rotate the micro-mirror around the pivot, with the connection structure deformed to accommodate the rotation. The array of micro-mirrors can receive incident light beam, and each micro-mirror can be rotated at a common rotation angle to project/steer the incident light beam at a target direction. Each micro-mirror can be rotated around two orthogonal axes to provide a first range of angles of projection along a vertical dimension and to provide a second range of angles of projection along a horizontal dimension. The first range and the second range of angles of projection can define a two-dimensional field of view (FOV) in which light is to be projected to detect/scan an object. The FOV can also define the direction of incident lights, reflected by the object, that are to be detected by the receiver.

Compared with using a single mirror to steer the incident light, a micro-mirror array can provide a comparable or even larger aggregate reflective surface area. With a larger reflective surface area, incident light with a larger beam width can be projected onto the micro-mirror array for the light steering operation, which can mitigate the effect of dispersion and can improve the imaging/ranging resolution. Moreover, each individual micro-mirror has a smaller size and mass, which can lessen the burdens on the actuators that control those micro-mirrors and can improve reliability. Further, the actuators can rotate the micro-mirrors by a larger rotation angle for a given torque, which can improve the FOV of the micro-mirror array.

Although using a micro-mirror array for light steering can provide numerous advantages over a single-mirror arrangement, controlling multiple micro-mirrors to move in a uniform fashion (e.g., to rotate by a common rotation angle) can be challenging. For example, due to precision limitations in the fabrication process, component variations may exist among the micro-mirror assemblies. One example source of variation can come from the connection structure that connects the micro-mirror to a pivot point of rotation, such as the substrate, a frame of a gimbal structure, etc. As described above, the connection structure deforms to accommodate the rotation motion of the micro-mirror. The spring stiffness of the connection structure can control the torque required to deform the connection structure to accommodate the rotation of the micro-mirror by a target rotation angle. Due to precision limitations, there can be variations in the dimensions of the connection structures among the micro-mirror assemblies, which can lead to differences in the spring stiffness of the connection structures and the required torque among the micro-mirror assemblies. If the actuators are controlled to generate the same torque, the resulting rotation angles may vary among the micro-mirrors. The non-uniformity in the rotation angles can increase the dispersion of the reflected light and reduce the imaging/ranging resolution.

Conceptual Overview of Certain Embodiments

Examples of the present disclosure relate to a light steering system that can address the problems described above. Various embodiments of the light steering can include a plurality of mirrors to perform light steering, such as those shown and described below with respect to FIG. 2A-FIG. 5. The light steering system can be used as part of a transmitter to control a direction of projection of output light. The light steering system can also be used as part of a receiver to select a direction of input light to be detected by the receiver. The light steering system can also be used in a coaxial configuration such that the light steering system can project output light to a location and detects light reflected from that location.

In some embodiments, a light steering system may include a light source, a semiconductor integrated circuit comprising a microelectromechanical systems (MEMS) and a controller, and a receiver. The MEMS may include an array of micro-mirror assemblies, each micro-mirror assembly comprising a micro-mirror connected to the substrate via an elastic connection structure and rotatable around the connection structure. The micro-mirror assemblies of the MEMS may be configured to reflect light from the light source along an output projection path. The micro-mirror assemblies of the MEMS may also be configured to reflect incident light propagating along an input path to the receiver.

Each micro-mirror assembly further comprises an actuator controllable by the controller to rotate the micro-mirror. The controller can determine a target rotation angle for each micro-mirror assembly to set a target direction of the output projection path. For each micro-mirror assembly, the controller can also generate a control signal for the actuator based on the target rotation angle and based on a spring stiffness of the connection structure, and transmit the control signals to the array of micro-mirror assemblies. In some embodiments, the light steering transmitter can also be part of LiDAR module.

In some embodiments, the connection structure can be in the form of a torsion bar. An example of the connection structure is shown and described below with respect to FIG. 2C and FIG. 2D. An actuator, such as an electrostatic actuator (e.g., a comb drive), an electromagnetic actuator, a piezoelectric actuator, etc., such as those shown and described below with respect to FIG. 2E, can provide a torque to rotate the micro-mirror and to deform the connection structure. The connection structure may have a spring stiffness which affects the torque required from the actuator to rotate the micro-mirror and to deform the connection structure. The connection structure may be configured such that its spring stiffness is dominated by one of the dimensions of the spring stiffness. For example, a torsion bar may have a width (e.g., parallel with the mirror surface) that is of multiple orders smaller than a thickness (e.g., perpendicular to the mirror surface), such that the spring stiffness of the torsion bar can become dominated by and directly proportional to the thickness. In such an example, it is desirable to adjust the torque generated by the actuator to account for the spring stiffness of the torsion bar for each micro-mirror, so that the micro-mirror can rotate uniformly at the target rotation angle.

In some embodiments, the controller may include a control signal generation module for an actuator based on the target rotation angle, and a control signal adjustment module to adjust the control signal based on an electrical property (e.g., electrical resistance) that reflects the dominating dimension of the connection structure, as shown and described below with respect to FIG. 3A. The connection structure may have two electrical contacts which can be used to measure an electrical resistance of the connection structure to infer the dominating dimension as well as the spring stiffness. Examples of placements of the electrical contacts are shown and described below with respect to FIG. 3B. For example, two electrical contacts can be placed on two opposite sides of the connection structure separated by the thickness, and an electrical resistance measured across the two electrical contacts can be directly proportional to the thickness. As another example, two electrical contacts can be placed on two opposite sides of the connection structure separated by the length (parallel with the rotational axis of the mirror), and an electrical resistance measured across the two electrical contacts can be inversely proportional to the thickness. In both cases, control signal adjustment module can adjust the control signal based on the electrical resistance across the two electrical contacts. In some embodiments, control signal adjustment module can obtain the electrical resistance information for the connection structure of each micro-mirror to adjust the control signal of each actuator based on the information. In some embodiments, control signal adjustment module can obtain the electrical resistance information from a subset of the connection structures (e.g., one connection structure selected from different regions on the micro-mirror array) to adjust the control signals.

In some embodiments, the controller can include an amplifier circuit configured to amplify a control signal corresponding to a rotation angle by an amplification gain, with the amplification gain determined based on a ratio between a reference resistance and the resistance across the two electrical contacts. Examples of the amplifier circuits are shown and described below with respect to FIG. 4A and FIG. 4B. The amplifier circuit may include an operational amplifier (opamp) configured as an inverting amplifier. In some embodiments where the electrical contacts are separated by a length of the connection structure, a first electrical contact of the connection structure can receive a input control signal, whereas a second electrical contact of the connection structure can be connected to a negative input of the opamp, such that the electrical resistance between the electrical contacts forms an input resistor. Moreover, a reference resistor having the reference resistance can be connected between the output and the negative input of the opamp to form a feedback resistor. With such arrangements, the amplification gain to become inversely proportional to the connection structure electrical resistance and to become proportional to the thickness. In some embodiments where the electrical contacts are separated by the thickness of the connection structure, the connections of the reference resistor and the connection structure with the opamp can be reversed, which enables the amplification gain to become directly proportional to the connection structure electrical resistance and to become proportional to the thickness. In both examples, an array of amplifier circuits can be provided to scale the control signals for each actuator based on the spring stiffness of the connection structure at each actuator.

In some embodiments, the controller can include a measurement circuit configured to measure the electrical resistance between the electrical contacts of the connection structure. An example of the measurement circuit is shown and described below with respect to FIG. 5. The measurement circuit may include a current generator, an analog-to-digital converter (ADC), a set of switches, and a set of registers. To perform electrical resistance measurement of a connection structure, the controller can control the switches to connect the first electrical contact of the connection structure to the current source and the second electrical contact of the connection structure to ground. The current generator can inject a pre-determined current into the first electrical contact, and a voltage that reflects the electrical resistance can develop across the electrical contacts. The ADC can measure the voltage and store a digital value representing the voltage at a register corresponding to the connection structure. The measurement process can be repeated sequentially for each connection structure, and a voltage map for each connection structure within the micro-mirror array can be stored in the set of registers. In some embodiments, the measurement process can be performed as a calibration process before the light steering operation. During the light steering operation, the voltage map can be provided to the control signal adjustment module, which can scale the control signal for each actuator based on the voltage map and provide the scaled control signals to the actuators to perform the light steering operation. The scaling can be performed in digital domain, and a digital-to-analog converter (DAC) can be provided to convert the control signals to analog form and to provide the analog control signals to the actuators.

With the disclosed embodiments, the controller can adapt the control signals to account for the variations in the spring stiffness of the connection structure among the micro-mirror assemblies. As a result, the rotation of the micro-mirrors among the mirror-mirror assemblies can become more uniform, which can reduce the dispersion of the reflected light and improve the imaging/ranging resolution. All of these can improve the robustness and performance of a light steering system, which can be part of a light steering transmitter and/or a light steering receiver, over conventional implementations.

Typical System Environment for Certain Embodiments

FIG. 1 illustrates an autonomous vehicle 100 in which the disclosed techniques can be implemented. Autonomous vehicle 100 includes a LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering transmitter 104 and a receiver 106. Light steering transmitter 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light pulse 110, and can perform a ranging determination (e.g., a distance of the object) based on a time difference between light signals 108 and 110. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., slowing or stopping) to avoid collision with object 112 based on the detection and ranging of object 112 by LiDAR module 102.

FIGS. 2A-2E illustrate examples of internal components of a LiDAR module 102. LiDAR module 102 includes a transmitter 202, a receiver 204, a LiDAR controller 206 which controls the operations of transmitter 202 and receiver 204. Transmitter 202 includes a light source 208 and a collimator lens 210, whereas receiver 204 includes a lens 214 and a photodetector 216. LiDAR module 102 further includes a mirror assembly 212 and a beam splitter 213. In LiDAR module 102, transmitter 202 and receiver 204 can be configured as a coaxial system to share mirror assembly 212 to perform light steering operation, with beam splitter 213 configured to reflect incident light reflected by mirror assembly 212 to receiver 204.

Figure 2A:
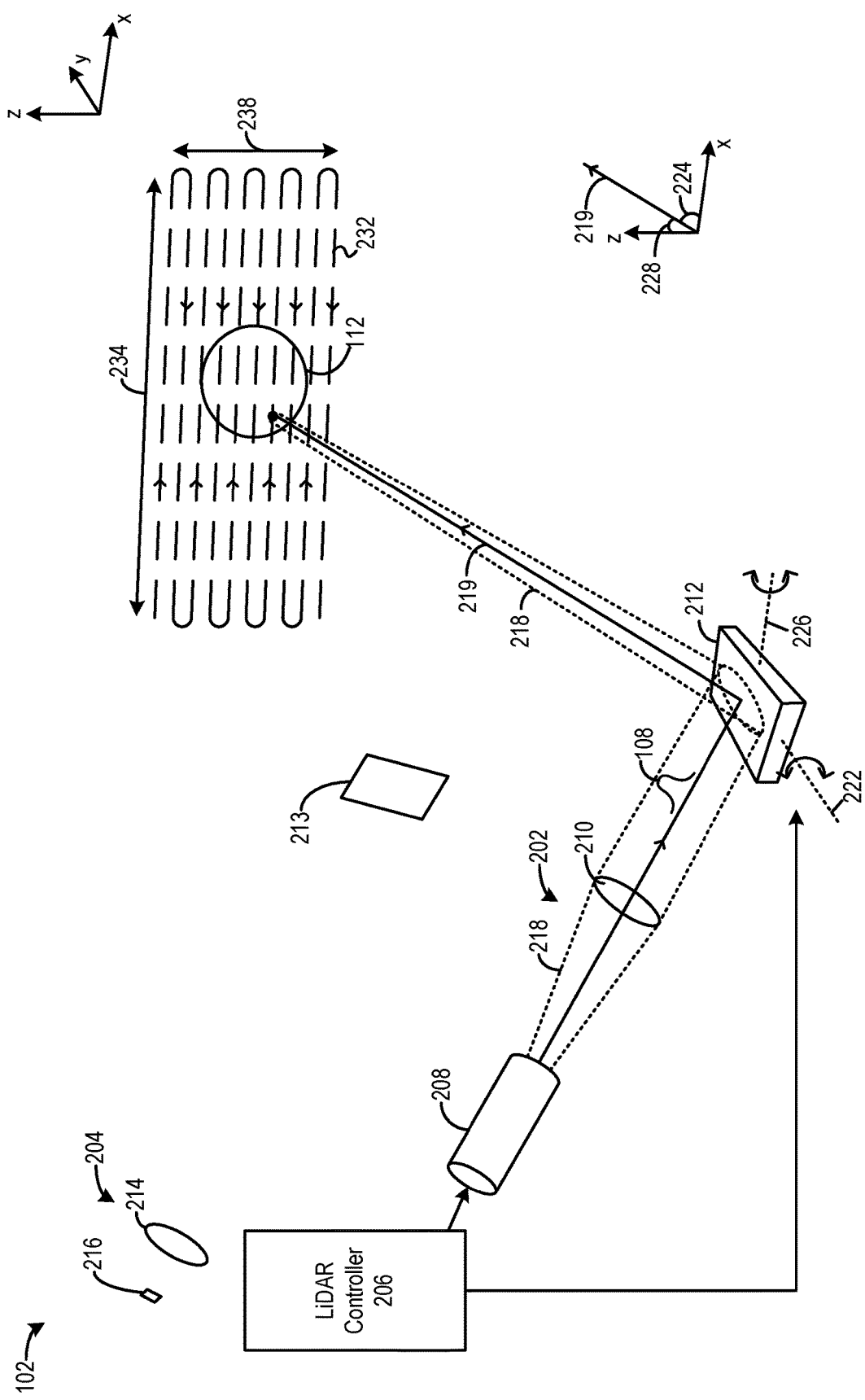
FIG. 2A-FIG. 2E illustrate examples of a light steering system, according to certain embodiments.

FIG. 2A illustrates a light projection operation. To project light, LiDAR controller 206 can control light source 208 (e.g., a pulsed laser diode, a source of FMCW signal, AMCW signal, etc.) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light 218 to steer it along an output projection path 219 towards object 112. Mirror assembly 212 can include one or more rotatable mirrors. FIG. 2A illustrates mirror assembly 212 as having one mirror, but as to be described below, a micro-mirror array comprising multiple micro-mirror assemblies can be used to provide the steering capability of mirror assembly 212. Mirror assembly 212 further includes one or more actuators (not shown in FIG. 2A) to rotate the rotatable mirrors. The actuators can rotate the rotatable mirrors around a first axis 222, and can rotate the rotatable mirrors along a second axis 226. The rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated light beam 218 to form reflected light signal, which can be received by receiver 204.

Figure 2B:
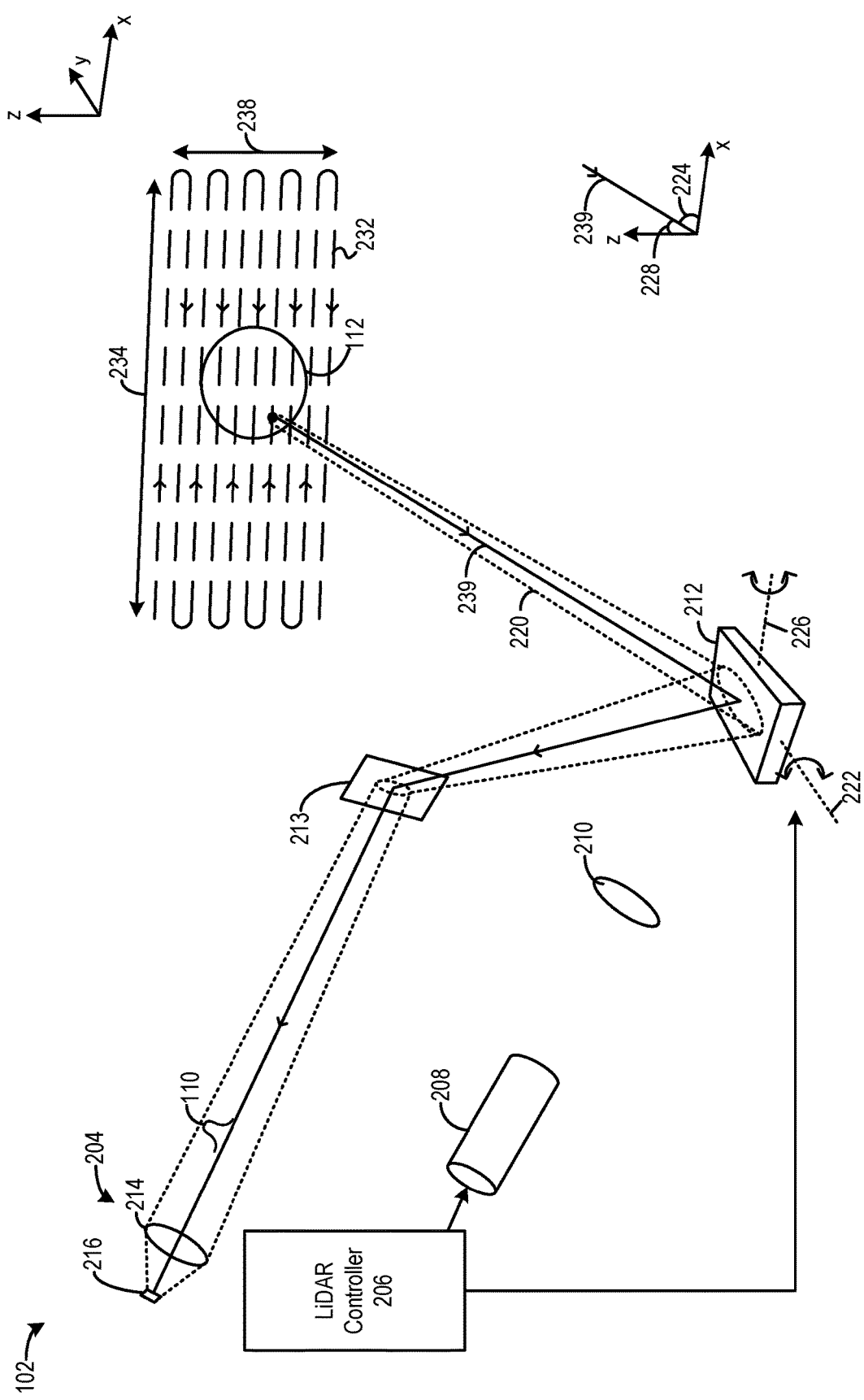

FIG. 2B illustrates a light detection operation. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112, such as light signal 110 generated by the reflection of collimated light beam 218 by object 112, and not to receive other signals. As a result, the effect of environment disturbance on the ranging/imaging of the object can be reduced, and the system performance can be improved.

Figure 2C:
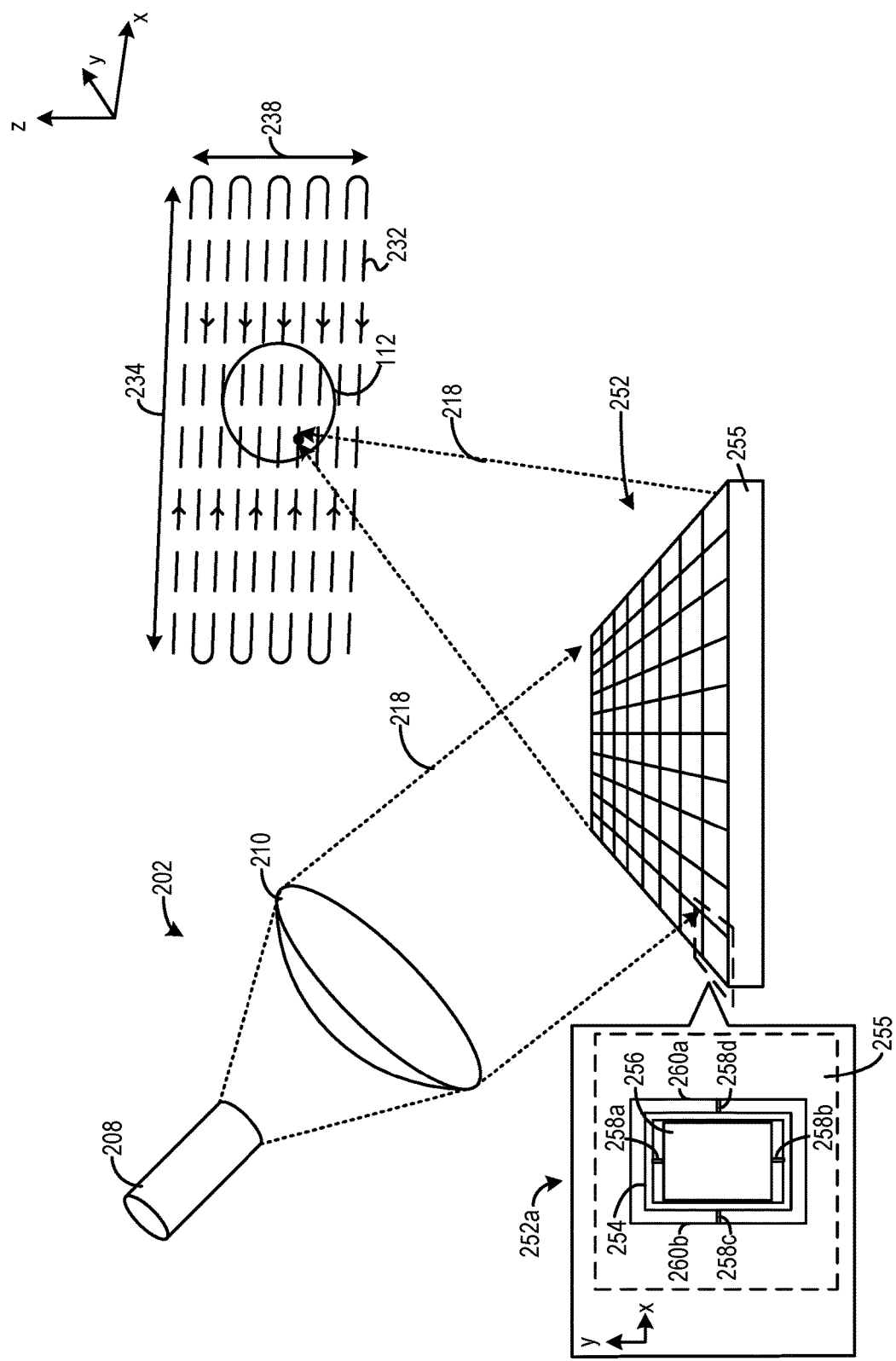
Figure 2D:
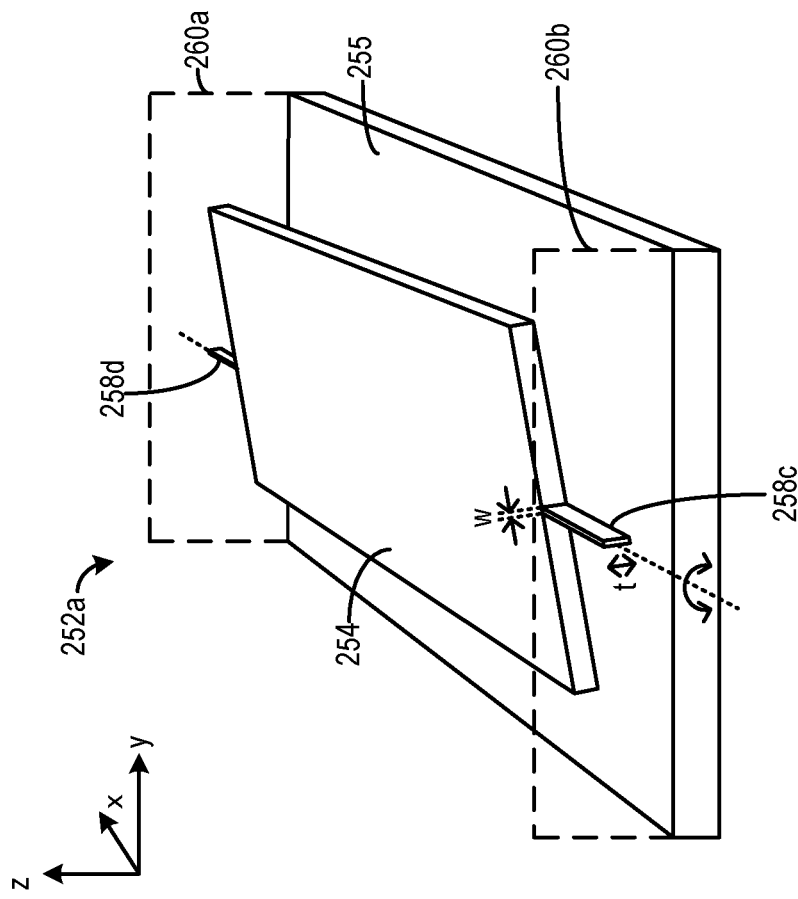
Figure 2D:
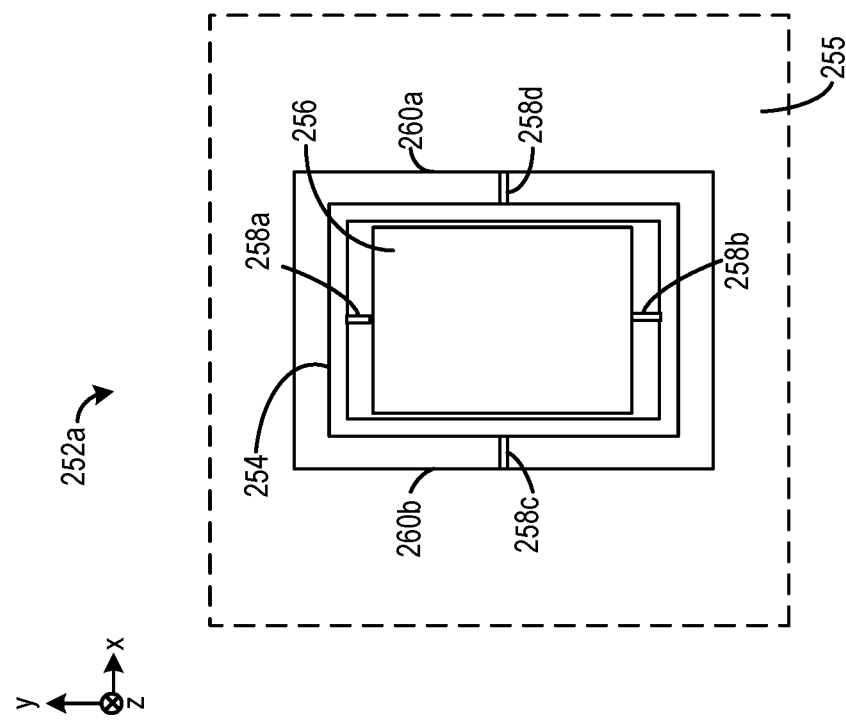

FIG. 2C illustrates an example of a micro-mirror array 250 that can be part of light steering transmitter 202 and can provide the steering capability of mirror assembly 212. Micro-mirror array 250 can include an array of micro-mirror assemblies 252, including micro-mirror assembly 252a. FIG. 2D illustrates an example of micro-mirror assembly 252a. The array of micro-mirror assemblies 252 can include a microelectromechanical system (MEMS) implemented on a semiconductor substrate 255. Each of micro-mirror assemblies 252 may include a frame 254 and a micro-mirror 256 forming a gimbal structure. Specifically, connection structures 258a and 258b connect micro-mirror 256 to frame 254, whereas connection structures 258c and 258d connect frame 254 (and micro-mirror 256) to side walls 260a and 260b semiconductor substrate 255. A pair of connection structures can define a pivot/axis of rotation for micro-mirror 256. For example, connection structures 258a and 258b can define a pivot/axis of rotation of micro-mirror 256 about the y-axis within frame 254, whereas connection structures 258c and 258d can define a pivot/axis of rotation of frame 254 and micro-mirror 256 about the x-axis with respect to semiconductor substrate 255.

Each of micro-mirror assemblies 252 can receive and reflect part of light beam 218. The micro-mirror 256 of each of micro-mirror assemblies 252 can be rotated by an actuator of the micro-mirror assembly (not shown in FIG. 2C) at a first angle about the y-axis (around connection structures 258a and 258b) and at a second angle about the x-axis (around connection structures 258c and 258d) to set the direction of output projection path for light beam 218 and to define the FOV, as in FIG. 2A, or to select the direction of input light to be detected by receiver 204, as in FIG. 2B.

To accommodate the rotation motion of mirror 256, connection structures 258a, 258b, 258c, and 258d are configured to be elastic and deformable. The connection structure can be in the form of, for example, a torsion bar, a spring, etc., and can have a certain spring stiffness. The spring stiffness of the connection structure can define a torque required to rotate mirror 256 by a certain rotation angle, as follows:

$$\tau = -K\theta \quad \text{(Equation 1)}$$

In Equation 1, τ represents torque, K represents a spring constant that measures the spring stiffness of the connection structure, whereas θ represents a target angle of rotation. The spring constant can depend on various factors, such as the material of the connection structure, the cross-sectional area of the connection structure, etc. For example, the spring constant can be defined according to the following equation:

$$K = \frac{k_2 \times G \times w^3 \times t}{L} \quad \text{(Equation 2)}$$

In Equation 2, L is the length of the connection structure, G is the shear modulus of material that forms the connection structure, $k_2$ is a factor that depends on the ratio between thickness (t) and width (w) given as t/w. The larger the ratio t/w, the more $k_2$ is like a constant. The table below provides illustrative examples of $k_2$ for different ratios of t/w:

| Ratio of t/w | $k_2$ |
|---|---|
| 1 | 0.141 |
| 2 | 0.229 |
| 3 | 0.263 |
| 6 | 0.298 |
| ∞ | 0.333 |

In a case where w is one-third oft or less, $k_2$ becomes almost like a constant, and spring constant K can be directly proportional to thickness.

Figure 2E:
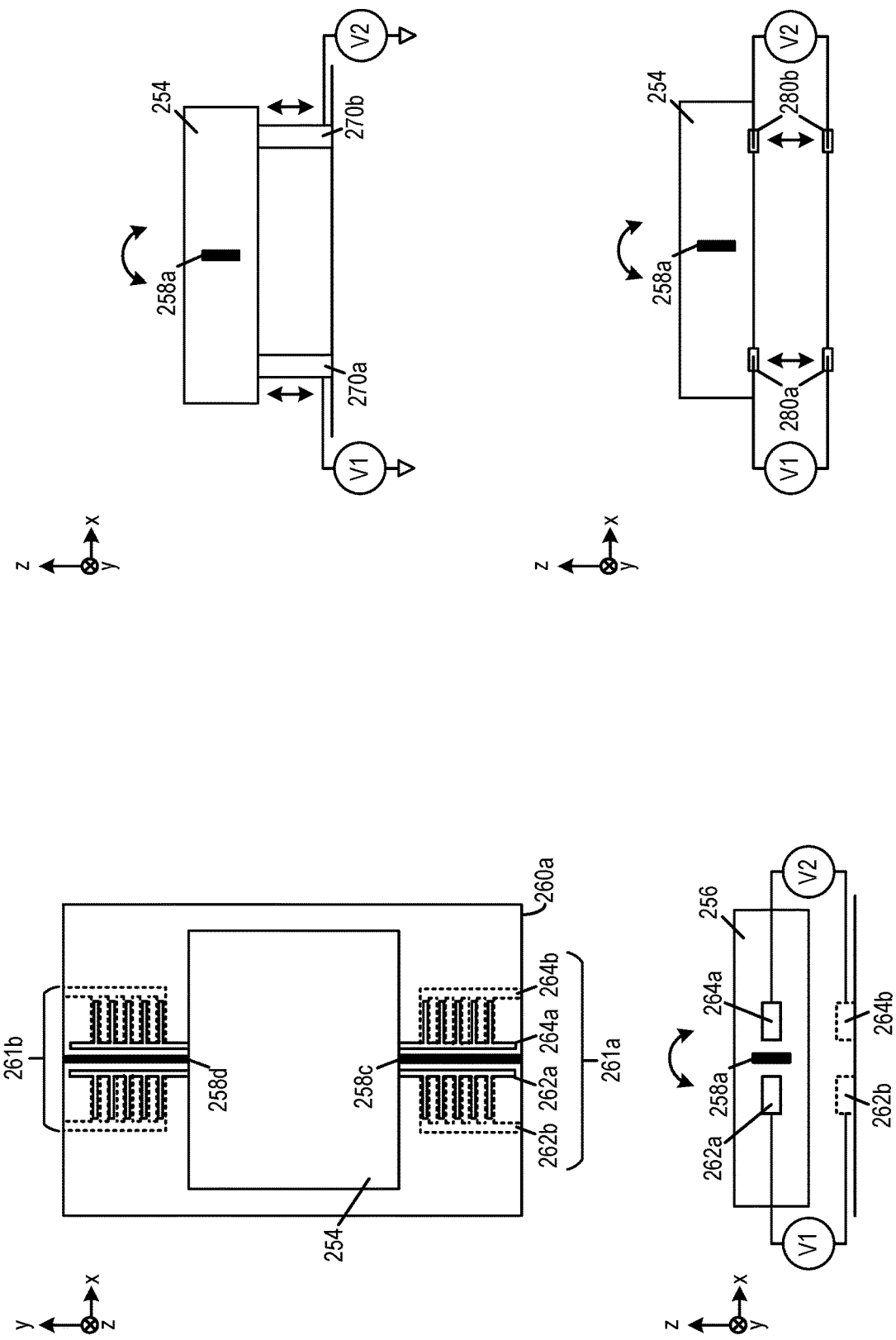

Various types of actuators can be included in micro-mirror assemblies 252 to provide the torque, such as an electrostatic actuator, an electromagnetic actuator, a piezoelectric actuator, etc. FIG. 2E illustrates examples of actuators that can be included in micro-mirror assemblies 252 to provide the torque. As shown in FIG. 2E, a pair of comb drives 261a and 261b can be positioned around, respectively, connection structures 258c and 258d. Each of comb drives 261a and 261b and include two pair of electrodes, such as electrodes 262a and 262b and electrodes 264a and 264b for comb drive 261a. Electrodes 262a and 264a can be connected to micro-mirror 256, whereas electrodes 262b and 264b can be connected to sidewall 260a. When a voltage V1 is applied across electrodes 262a and 262b, opposite charges can accumulate and an electrostatic force F1, defined according to the following equation, can be developed between electrodes 262a and 262b due to the accumulation of charges. Electrostatic force F1 can apply a torque and cause micro-mirror 256 to rotate in a clockwise direction.

$$F1 = -P(V1)^2 \quad \text{(Equation 3)}$$

In Equation 3, P is a constant based on permittivity, a number of fingers of the electrodes, gap between the electrodes, etc. As shown in Equation 3, the electrostatic force (and the resulting net torque) can be directly proportional to a square of applied voltage.

Moreover, when a voltage V2 is applied across electrodes 264a and 264b, an electrostatic force F2 can develop according to Equation 2. Electrostatic force F2 can also apply a torque and cause micro-mirror 256 to rotate in a counter-clockwise direction.

In some examples, a pair of piezoelectric actuators 270a and 270b, or a pair of electromagnetic devices 280a and 280b can also be positioned on two sides of a connection structure (e.g., connection structure 258c). Each of the piezoelectric actuators 270a and 270b can expand or contract based a voltage (e.g., V1 and V2) applied to the actuators and can create a torque to push micro-mirror 256 to rotate clockwise or counterclockwise around connection structure 258a. Moreover, each pair of electromagnetic actuators 280a and 280b can also generate an electromagnetic force based on a voltage (e.g., V1 and V2) applied to the actuators. The electromagnetic force between each pair of electromagnetic actuators 280a and 280b can also create a torque to rotate micro-mirror 256 clockwise or counter-clockwise around connection structure 258a. For both piezoelectric actuators 270a and 270b and electromagnetic actuators 280a and 280b, the net torque can be directly proportional to the applied voltage, according to the following equation:

$$F1 = -Q(V1) \quad \text{(Equation 4)}$$

In Equation 4, F1 can be the force provided by an actuator (e.g., piezoelectric actuator 270, electromagnetic actuator 280a, etc.), whereas V1 is the voltage applied to the actuator. Q can be a constant based on various physical properties of the actuator.

To rotate micro-mirror 256, a controller can set the voltages V1 and V2 to set a torque applied to micro-mirror 256 for each of comb drives 261a and 261b, piezoelectric actuators 270a and 270b, and electromagnetic devices 280a and 280 based on Equations 2 and 3.

The torque required to rotate micro-mirror 256 by a target angle θ, however, depends on the spring constant of the connection structure. As described above, the spring constant of the connection structure may depend on a certain dominant physical dimension of the connection structure (e.g., the thickness), and the dominant dimension may vary due to precision limits of the fabrication process. Referring back to the example of connection structures 258a and 258c of FIG. 2C, while the width (w) and length of the connection structures can be relatively well controlled during the fabrication of the MEMS device, the thickness t of the connection structure may vary among the micro-mirror assemblies. The spring constant/stiffness of the connection structure as well as the required torque for a target rotation angle may also vary among the micro-mirror assemblies. Without accounting for the variations in the spring stiffness of the connection structures, micro-mirror array 250 may steer the light at different directions, which can disperse the output light and reduce the resolution of the imaging/ranging applications that use the output light. Moreover, micro-mirror array 250 also cannot provide accurate selection of the incident light direction, and the receiver may receive noise signals as a result.

Examples of Adaptive Control Signal Generation

Figure 3A:
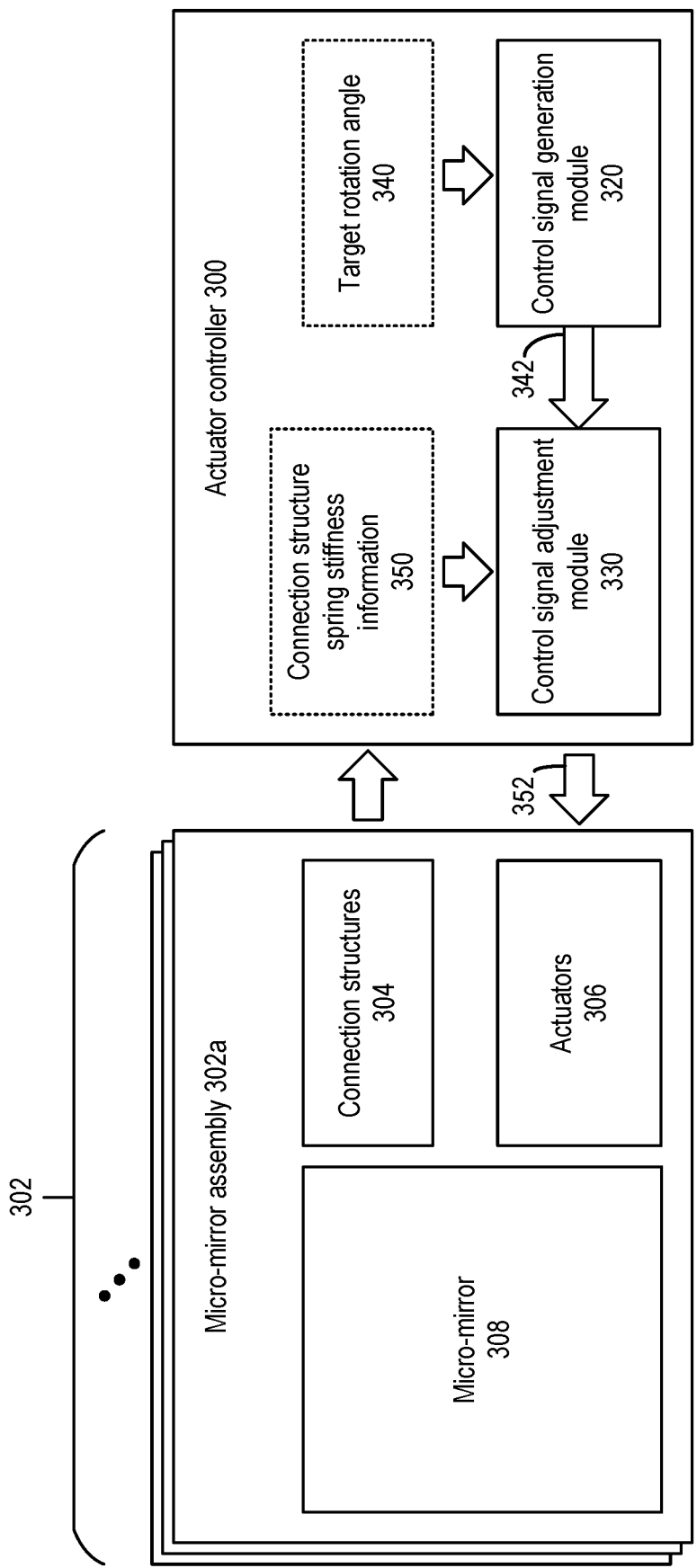
FIG. 3A-FIG. 3B illustrate an example of an actuator controller, according to embodiments of the present disclosure.
Figure 3B:
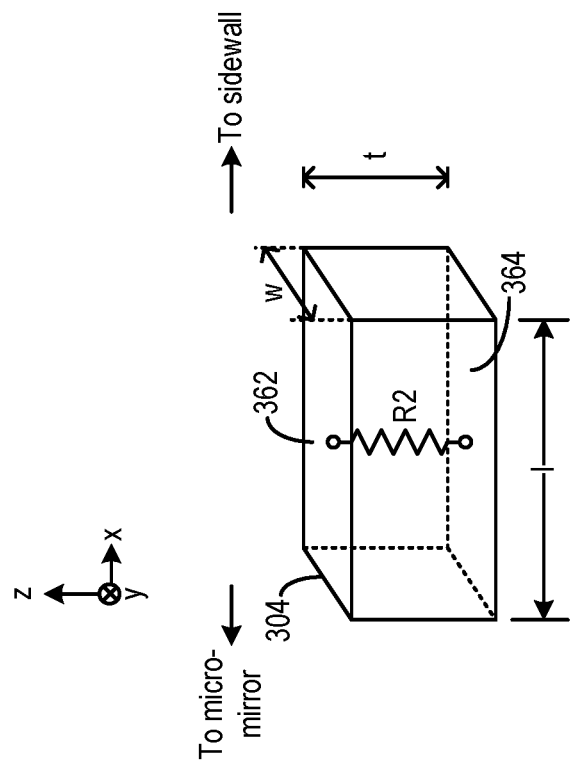
Figure 3B:
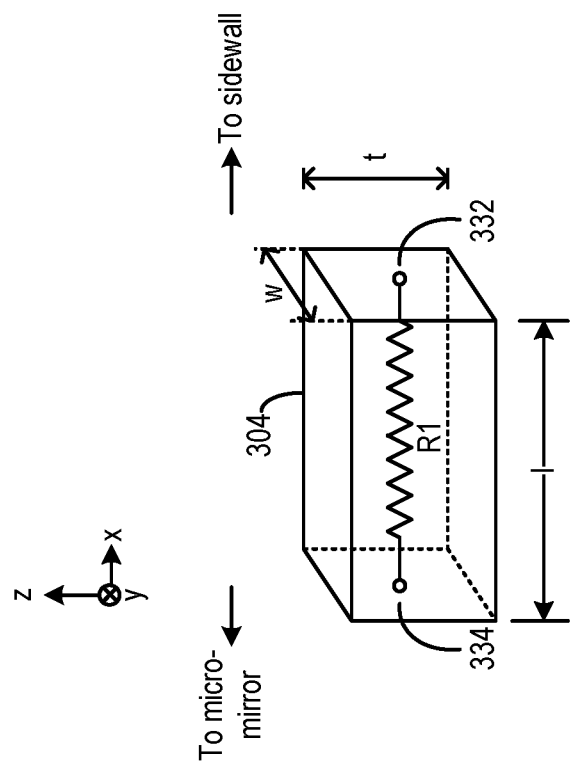

FIG. 3A and FIG. 3B illustrate an example of an actuator controller 300, according to embodiments of the present disclosure. Actuator controller 300 is coupled with an array of micro-mirror assemblies 302. Each of array of micro-mirror assemblies 302, such as micro-mirror assembly 302a, includes connect structures 304, actuators 306, and a micro-mirror 308. Actuator controller 300 includes a control signal generation module 320 and a control signal adjustment module 330. Control signal generation module 320 can receive target rotation angle information 340 (e.g., from LiDAR controller 206) to generate a control signal 342. The control signal can be in the form of a voltage to be applied to the actuator. The magnitude of the voltage can be determined based on a torque required to achieve the target rotation angle, and a property of the actuator that determines a relationship between the voltage and the torque. The torque requirement can be based on a reference spring constant of the connect structures 304 and the target rotation angle, according to Equation 1 above. The reference spring constant can be a nominal or expected spring constant of the connection structures 304. Moreover, the relationship between the voltage and the torque can be specific to the topology/architecture of actuators 306. For example, if the actuator is an electrostatic actuator (e.g., a comb drive 261), the voltage can be set as directly proportional to a square root of the torque, according to Equation 2 above. If the actuator is a piezoelectric actuator (e.g., piezoelectric actuators 270) or an electromagnetic actuator (e.g., electromagnetic actuators 280), the voltage can be set as directly proportional to the torque, according to Equation 3 above.

Control signal adjustment module 330 can adjust control signal 342 based on connection structure spring stiffness information 350 to create one or more adjusted control signals 352. Connection structure spring stiffness information 350 may include information indicating the actual spring stiffness of one or more connection structures 304. Control signal adjustment module 330 can scale control signal 342 based on, for example, a ratio between the actual spring stiffness (provided from information 350) and the nominal stiffness (used to determine control signal 342) of the connection structure, to create adjusted control signal 352, according to the following equation:

$$\text{Signal}_{352} = \frac{\text{Actual spring stiffness}}{\text{Nominal spring stiffness}} \times \text{Signal}_{342} \quad \text{(Equation 5)}$$

Control signal 352 can be sent to actuators 306 to set the torque for rotating micro-mirror 308. The adaptation of control signal 352 based on connection structure spring stiffness information 350 enables generation of a torque that reflects both the actual spring stiffness of the connection structures 304 in the array of micro-mirror assemblies 302 and the target rotation angle. For example, in a case where the actual spring stiffness exceeds the nominal spring stiffness, the magnitude of control signal 352 can be increased, whereas in a case where the actual spring stiffness is below the nominal spring stiffness, the magnitude of control signal 352 can be decreased. With such arrangements, the torque generation can account for the variations in the spring stiffness among the micro-mirror assemblies, and the uniformity of rotation angle among the micro-mirror assemblies can be improved.

Depending on the uniformity and power consumption requirement, connection structure spring stiffness information 350 may include the actual spring stiffness information of connection structures 304 of each micro-mirror assembly within the array, or a subset of the micro-mirror assemblies. For example, in a case where connection structure spring stiffness information 350 may include the actual spring stiffness information of connection structures 304 of each micro-mirror assembly within the array, control signal adjustment module 330 can customize control signal 352 individually for each micro-mirror assembly based on the actual spring stiffness of connections structures 304 in each micro-mirror assembly, which can maximize the uniformity rotation angle among the micro-mirror assemblies, but the additional scaling operation can increase power. As another example, array of micro-mirror assemblies 302 can be divided into multiple regions, with one representative micro-mirror assembly selected to represent each region, and connection structure spring stiffness information 350 may include the actual spring stiffness information of connection structures 304 of the representative micro-mirror assemblies of the regions. Control signal adjustment module 330 can generate a control signal 352 for each region, with each control signal 352 scaled based on the actual spring stiffness information of the representative micro-mirror assembly for each region. Such arrangements does not account for the variation of spring stiffness within each region of micro-mirror assemblies and can lead to reduction in the uniformity of the rotation angles, but the reduced scaling operation can save power and reduce power consumption.

Connection structure spring stiffness information 350 can represent the actual spring stiffness of connection structures 304 in various forms, such as an electrical resistance that correlates to a dimension that dominates the spring stiffness of connection structures 304. For example, in a case where the thickness of connection structures 304 dominates the spring stiffness, an electrical resistance of connection structures 304 that reflects the thickness can be used to represent the actual spring stiffness.

FIG. 3B illustrates examples of arrangements of using electrical resistance to represent the thickness of a connection structure. The figure on the left shows an electrical resistance R1 along a length (represented by l) of connection structure 304 between two ends 332 and 334, with one end connected to a micro-mirror and the other end connected to a sidewall of the substrate. The resistance R1 can be inversely proportional to the cross-sectional area of connection structure 304 (defined based on width w and thickness t), such that if the thickness t increases, resistance R1 decreases, and vice versa. To obtain resistance R1, two electrical contacts can be placed at, respectively, a first junction between connection structure 304 and the mirror and a second junction between connection structure 304 and the sidewall. Moreover, the figure on the right shows an electrical resistance R2 along the thickness t of connection structure 304 between two sides 362 and 364. The resistance R2 can be directly proportionally the thickness t, such that if the thickness t increases, resistance R2 increases, and vice versa. To obtain resistance R2, two electrical contacts can be placed at, respectively, sides 362 and 364.

Although FIG. 3B illustrates measuring electrical resistance of the connection structure (e.g., the torsion bar), it is understood that electrical resistance of other components at the vicinity of the connection structure can also be measured to provide thickness information. For example, a small block of silicon near the connection structure and on the same device layer of connection structure within the MEMS substrate can have similar thickness as the connection structure. As such, the electrical resistance of those components can be measured to obtain the thickness information of the connections structure.

Examples of Control Signal Adjustment Module 330

Figure 4A:
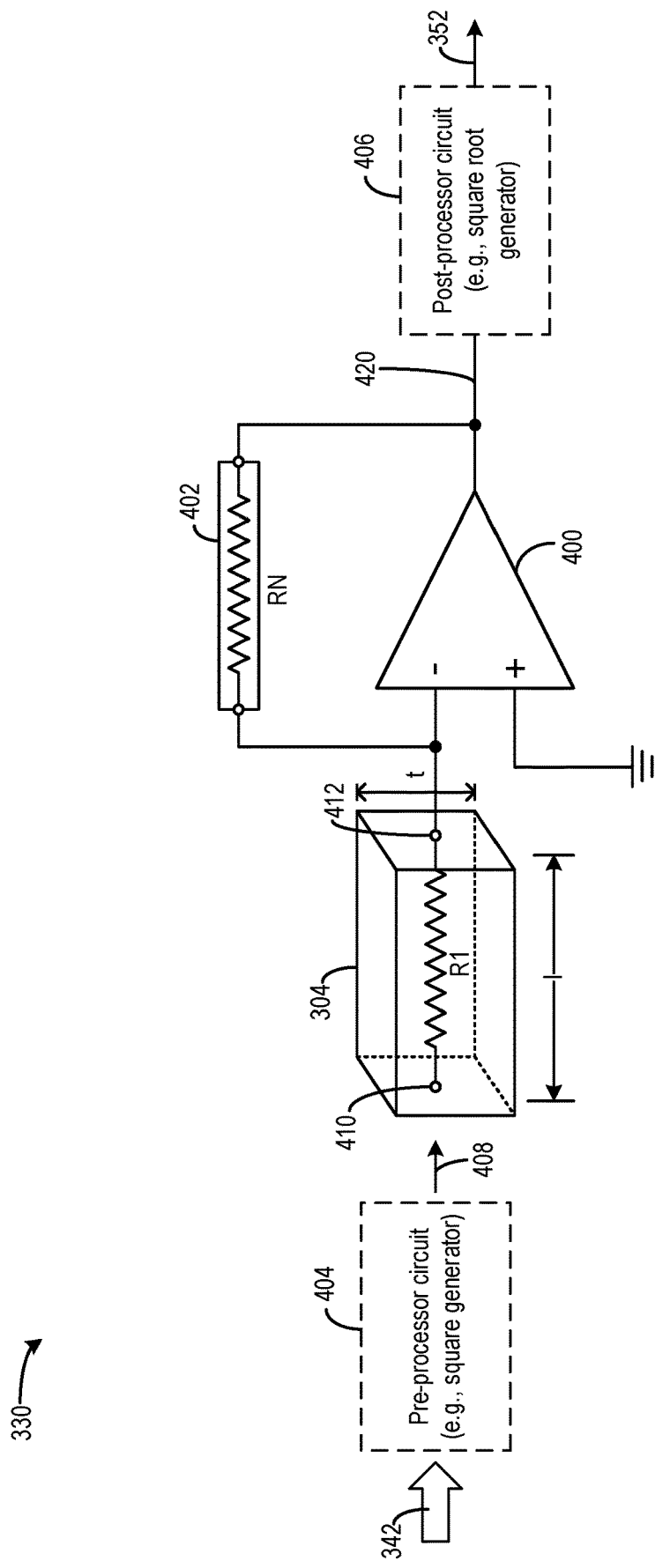
FIG. 4A and FIG. 4B illustrate examples of internal components of actuator controller of FIG. 3A-FIG. 3B, according to embodiments of the present disclosure.
Figure 4B:
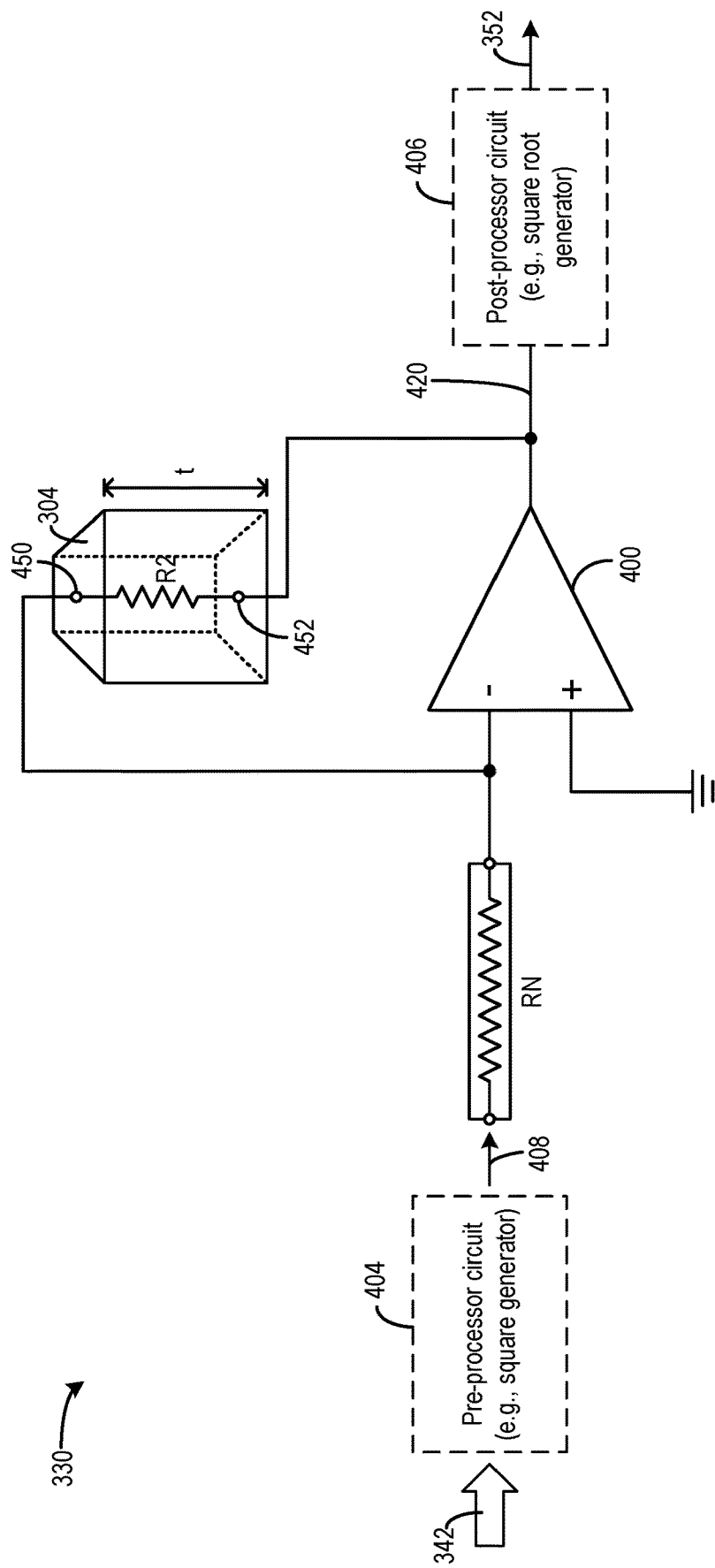

FIG. 4A and FIG. 4B illustrate examples of control signal adjustment module 330, according to certain embodiments.

As shown in FIG. 4A and FIG. 4B, control signal adjustment module 330 may include an operational amplifier (opamp) 400, a reference resistor 402, optional pre-processor circuit 404, and optional post-processor circuit 406. Reference resistor 402 may have a resistance equals to a nominal resistance RN of connection structure 304 along, for example, the length or the thickness of the structure. Connection structure 304 can be connected to reference resistor 402 and to opamp 400 as another resistor (of R1 or R2). Connection structure 304, reference resistor 402, and opamp 400 together can form an inverting amplifier that can scale control signal 342 based on a ratio between the resistance of connection structure 304 (R1 or R2) and the nominal resistance RN of reference resistor 402, to generate control signal 352.

For example, referring to FIG. 4A, electrical contacts separated by length l of connection structure 304 can be used to provide electrical resistance R1 to infer thickness t. With this configuration, the resistance R1 is inversely proportional to thickness t as well as the spring stiffness of connection structure 304. Connection structure 304 can be configured as an input resistor, with first electrical contact 410 connected to an input (e.g., control signal 342, signal 408, etc.) and second electrical contact 412 connected to the negative input of opamp 400. Reference resistor 402 can be configured as a feedback resistor and connected between the negative input and the output of opamp 400. With such arrangements, output signal 420 can be related to control signal 342 based on the following equation:

$$\text{Signal}_{420} = -\frac{RN}{R1} \times \text{Signal}_{342} \quad \text{(Equation 6)}$$

As shown in Equation 6, output signal 420 is inversely proportional to R1. When thickness t as well as spring stiffness of connection structure 304 increases, R1 decreases, and output signal 420 can be increased to provide a larger torque to achieve a target rotation angle. Moreover, when thickness t as well as spring stiffness of connection structure 304 decreases, R1 increases, and output signal 420 can be decreased to provide a smaller torque to achieve the target rotation angle.

Optional pre-processor circuit 404 and post-processor circuit 406 can perform additional processing on output signal 420 to generate control signal 352 based on the actuator property. For example, in a case where control signal 352 is a voltage signal provided to an electrostatic actuator (e.g., comb drive 261), the force/torque generated by the actuator is a function of a square of the input voltage. The amplification gain RN/R1 used to scale an input voltage signal V1 should be square-rooted, so that the resultant force F1 (and torque) can be scaled by the amplification gain RN/R1, according to following equation:

$$F1 = -P\left(\frac{RN}{R1}\right)(V1)^2 = -P\left(\sqrt{\frac{RN}{R1}} V1\right)^2 \quad \text{(Equation 7)}$$

To perform square-root operation of amplification gain RN/R1, in a case where the control signal 342 is a voltage represented by V1 in Equation 7, control signal 342 can be first squared by pre-processor circuit 404 to form squared signal 408, which can be amplified by the amplification gain of RN/R1 to obtain output signal 420. The output signal 420 can be processed by post-processor circuit 406 to perform a square root operation on output signal 420 to obtain control signal 352. Control signal 352 can be scaled by $$\sqrt{\frac{RN}{R1}}$$

with respect to control signal 342 with such arrangements. On the other hand, pre-processor circuit 404 and post-processor circuit 406 are not needed for actuators that generates a force directly proportional to the input voltage, such as a piezoelectric actuator, an electromagnetic actuator, or when control signal 342 represents the desired angle of rotation.

FIG. 4B illustrates another example of control signal adjustment module 330. As shown in FIG. 4B, electrical contacts separated by thickness t of connection structure 304 can be used to provide electrical resistance R2 to infer thickness t. With this configuration, the resistance R2 is directly proportional to thickness t as well as the spring stiffness of connection structure 304. Connection structure 304 can be configured as a feedback resistor, with first electrical contact 450 connected the negative input of opamp 400 and second electrical contact 452 connected to the output of opamp 400. Reference resistor 402 can be configured as an input resistor and connected between an input (e.g., control signal 342, signal 408, etc.) and the negative input of opamp 400. With such arrangements, output signal 420 can be related to control signal 342 based on the following equation:

$$\text{Signal}_{420} = -\frac{R1}{RN} \times \text{Signal}_{342} \quad \text{(Equation 8)}$$

As shown in Equation 8, output signal 420 is proportional to R1. When thickness t as well as spring stiffness of connection structure 304 increases, R1 increases, and output signal 420 can be increased to provide a larger torque to achieve a target rotation angle. Moreover, when thickness t as well as spring stiffness of connection structure 304 decreases, R1 decreases, and output signal 420 can be decreased to provide a smaller torque to achieve the target rotation angle. Optional pre-processor circuit 404 and post-processor circuit 406 can also provide square rooted amplification gain $$\sqrt{\frac{RN}{R1}}$$

for electrostatic actuators, as described above.

Figure 5:
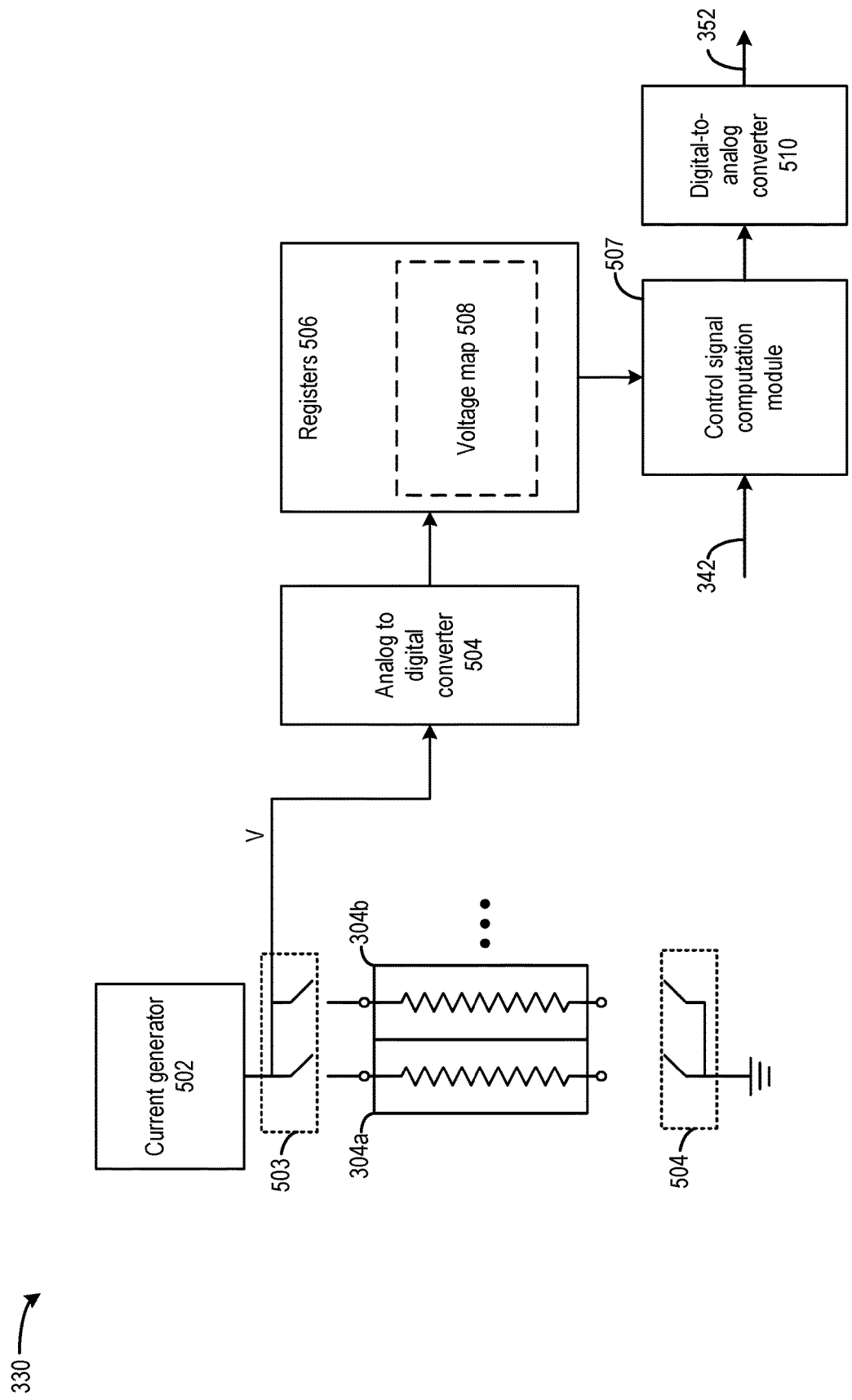
FIG. 5 illustrates another example of internal components of actuator controller of FIG. 3A-FIG. 3B, according to embodiments of the present disclosure.

FIG. 5 illustrates another example of control signal adjustment module 330, according to certain embodiments. As shown in FIG. 5, control signal adjustment module 330 can include a current generator 502, a set of switches 503, an analog-to-digital converter (ADC) 504, registers 506, a control signal computation module 507, and a digital-to-analog converter (DAC) 510. These components can operate to perform a measurement of a resistance across each connection structure 304, and scale control signal 342 based on the resistance measurement to generate control signal 352. Specifically, to measure a connection structure (e.g., connection structure 304*a*), switches 503 can be controlled to connect the connection structure between current generator 502 and ground. Current generator 502 can an inject a pre-determined current into the connection structure to develop a voltage V, and the voltage V can be digitized by ADC 504, and the digitized value can be stored in registers 506 The voltage V can represent the electrical resistance of the connection structure, and the electrical resistance, depending on the placement of the electrical contacts, can be directly or inversely proportional to the spring stiffness of the connection structure. The measurement can be repeated for each connection structure, and a resulting voltage map 508 that maps the measured voltage V to each connection structure can be obtained and stored in registers 506.

Control signal computation module 507 can then compute control signal 352 based on voltage map 508 and control signal 342, which can be in digital form. For example, control signal computation module a ratio between the measured voltage for each connection structure and a reference voltage representing a nominal thickness/spring stiffness can be computed, and scale up/down control signal 342 in similar fashions as described in FIG. 4A-FIG. 4B. The scaled control signal 342, in digital form, can be fed to DAC 510 to generate an analog version of control signal 352 for the actuator in each micro-mirror assembly. In some embodiments, control signal adjustment module 330 can perform the resistance measurements as part of a calibration process before the light steering operation to generate the voltage map. During the light steering operation, the voltage map can be provided to control signal adjustment module 330 to adjust the control signal for each actuator based on the voltage map.

Figure 6:
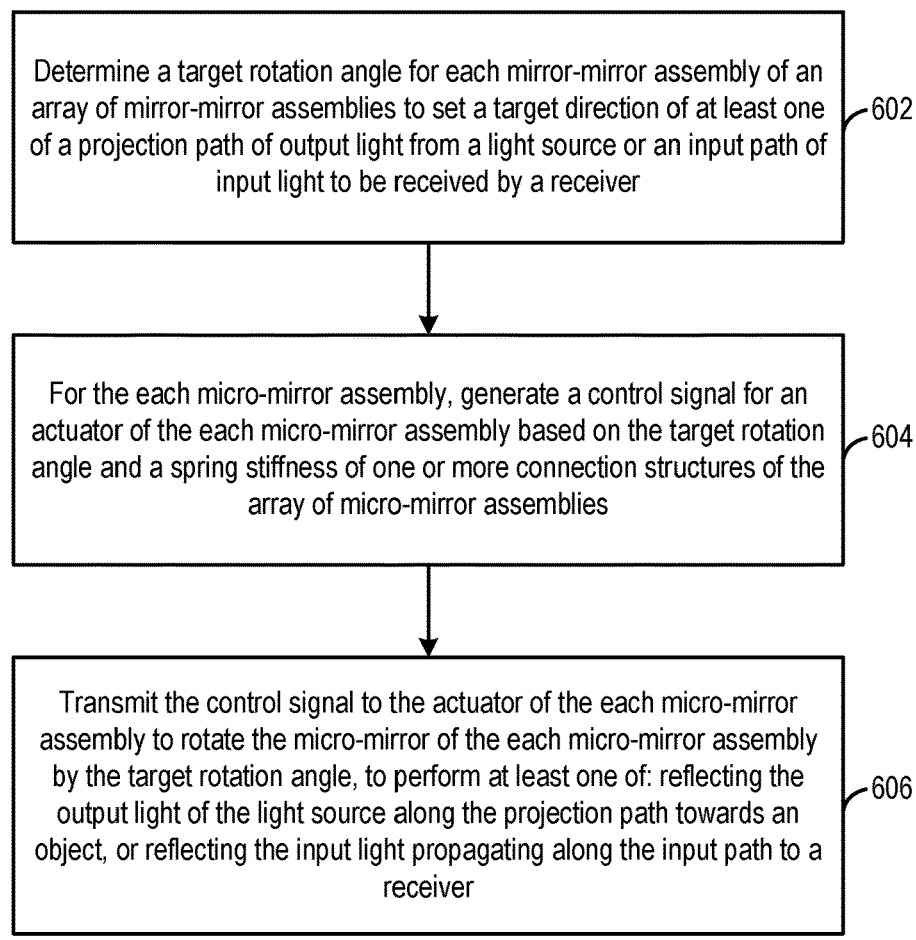
FIG. 6 illustrates a flowchart of a method of controlling an array of micro-mirror assemblies, according to certain embodiments.

FIG. 6 illustrates a flowchart of a method 600 of operating an array of micro-mirror assemblies, according to some embodiments. Method 600 can be performed by a controller, such as LiDAR controller 206, or an actuator controller (e.g., actuator controller 300 of FIG. 3A) coupled with the array of micro-mirror assemblies. The array of micro-mirror assemblies can be part of a LiDAR module. The array of micro-mirror assemblies can be configured to select a direction of a projection path of output light generated by a light source of the LiDAR module to steer the output light along the projection path towards an object. The array of micro-mirror assemblies can also be configured to select a direction of an input path, to steer input light propagating along the selected input path, but not input light propagating along other directions, to the receiver. Each micro-mirror assembly may include a micro-mirror that is rotatable. Each micro-mirror assembly may include a plurality of connection structures, such as connection structures 258*a*-258*d* of FIG. 2C, which can define the axes of rotation of the micro-mirror.

At operation 602, the controller determines a target rotation angle for each mirror-mirror assembly of the array of mirror-mirror assemblies to set a target direction of at least one of the projection path of the output light from the light source or the input path of input light. The target direction can be set based on, for example, a scanning pattern (e.g., scanning pattern 232 of FIG. 2A).

At operation 604, for the each micro-mirror assembly, the controller generates a control signal for an actuator based on the target rotation angle and a spring stiffness of one or more of the connection structures of the each micro-mirror assembly.

In some embodiments, the one or more of the connection structures of the each micro-mirror assembly may be sized such that the spring stiffness is linearly proportional to one dimension (e.g., thickness) of the connection structures, which in turn can be linearly proportional or inversely proportional to an electrical resistance of the connection structures, depending on how the electrical resistance is measured, as described in FIG. 3B. The control signal can be generated by an amplifier that receives a control signal from LiDAR controller 206 that is generated based on the target rotation angle. An amplifier (e.g., opamp 400 of FIG. 4A) can be provided to scale the control signal based on a ratio between an electrical resistance representing a thickness of the one or more of the connection structures and a reference electrical resistance, to adjust the control signal based on the thickness as well as the spring stiffness of the one or more of the connection structures.

In some embodiments, a calibration process can also be performed using an ADC to sequentially measure the electrical resistance of the connection structures in each (or a subset of) of the mirror-mirror assemblies. The measurement results for each micro-mirror assembly can be stored in a register, and a computation module can receive the control signal from LiDAR controller 206 in digital form and scale the control signal for each micro-mirror assembly based on the measurement result stored in the register. A DAC can be provided to convert the digital scaled control signals to analog form.

At operation 606, the controller can transmit the control signal (generated by the amplifier, by a DAC, etc.) to the actuator of the each micro-mirror assembly to rotate the micro-mirror of the each micro-mirror assembly by the target rotation angle. The array of micro-mirror assembles can then be controlled to reflect the output light of the light source along the projection path and/or reflect the input light propagating along the input path to a receiver.

Computer System

Figure 7:
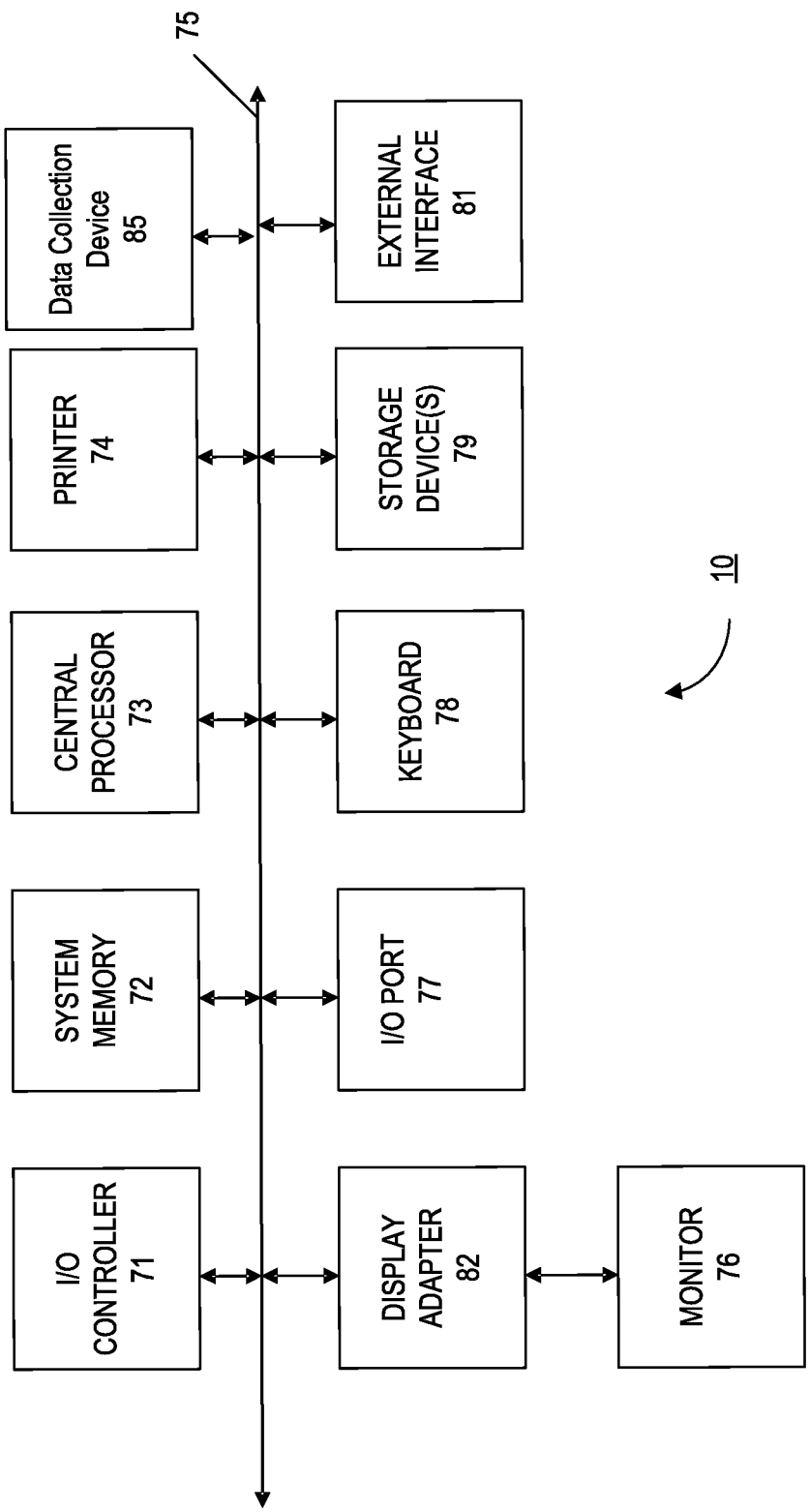
FIG. 7 illustrates an example computer system that may be utilized to implement techniques disclosed herein.

Any of the computer systems mentioned herein may utilize any suitable number of subsystems. Examples of such subsystems are shown in FIG. 7 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices. In some embodiments, a cloud infrastructure (e.g., Amazon Web Services), a graphical processing unit (GPU), etc., can be used to implement the disclosed techniques, including the techniques described from FIG. 1-FIG. 6.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus, the apparatus being part of a Light Detection and Ranging (LiDAR) module of a vehicle and comprising:
   a light source;
   a receiver; and
   a semiconductor integrated circuit comprising a microelectromechanical system (MEMS) and a controller, the MEMS comprising an array of micro-mirror assemblies, each micro-mirror assembly comprising:
   a micro-mirror connected to a substrate of the semiconductor integrated circuit via an elastic connection structure and rotatable around the connection structure to perform at least one of: reflect light from the light source along an output projection path, or reflect input light propagating along an input path to the receiver;
   an actuator controllable by the controller to rotate the micro-mirror;

wherein the controller is configured to:
  determine a target rotation angle for each micro-mirror assembly of the array of micro-mirror assemblies to set a target direction of at least one of the output projection path or the input path; and
  for the each micro-mirror assembly:
    generate a control signal for the actuator of the each micro-mirror assembly based on the target rotation angle and a spring stiffness of one or more connection structures of the array of micro-mirror assemblies; and
    transmit the control signal to the actuator of the each micro-mirror assembly to rotate the micro-mirror of the each micro-mirror assembly by the target rotation angle,
  wherein the connection structure is configured such that one dimension of the connection structure primarily contributes to the spring stiffness of the connection structure in comparison to other dimensions of the connection structure;
  wherein the controller is configured to generate the control signal based on an electrical resistance related to the one dimension of the one or more connection structures; and
  wherein a connection structure of the each micro-mirror assembly comprises at least one of: a torsion bar, or a spring.

2. The apparatus of claim 1, wherein the controller comprises a control signal generation module and a control signal adjustment module;
  wherein the control signal generation module is configured to generate a first signal based on the target rotation angle; and
  wherein the control signal adjustment module is configured to adjust the first signal based on the electrical resistance to generate the control signal.

3. The apparatus of claim 2, wherein the one dimension is a thickness of the connection structure perpendicular to a surface of the micro-mirror of the each micro-mirror assembly.

4. The apparatus of claim 3, wherein the control signal adjustment module is configured to adjust the first signal based on a ratio between the electrical resistance and a reference resistance representing a nominal spring stiffness of the one or more connection structures.

5. The apparatus of claim 4, wherein:
  the control signal adjustment module comprises a square-root generation circuit;
  the square-root generation circuit configured to perform a square-root operation on the control signal and transmit the square-rooted control signal to the actuator of the each micro-mirror assembly;
  wherein the actuator of the each micro-mirror assembly comprises an electrostatic actuator.

6. The apparatus of claim 4, wherein:
  a first connection structure of the one or more connection structures comprises a first electrical contact and a second electrical contact separated by a length of the connection structure perpendicular to the thickness;
  the control signal adjustment module comprises an amplifier and a reference resistor, the reference resistor having a resistance representing a nominal spring stiffness of the one or more connection structures;
  the first electrical contact is configured to receive the first signal;
  the second electrical contact is connected to a negative input terminal of the amplifier;
  the reference resistor is connected across the negative input terminal and an output terminal of the amplifier; and
  the control signal is obtained from the output terminal of the amplifier.

7. The apparatus of claim 4, wherein:
  a first connection structure of the one or more connection structures comprises a first electrical contact and a second electrical contact separated by the thickness;
  the control signal adjustment module comprises an amplifier and a reference resistor, the reference resistor having a resistance representing a nominal spring stiffness of the one or more connection structures;
  the reference resistor is configured to receive the first signal and transmit the first signal to a negative input terminal of the amplifier;
  the first electrical contact is connected to the negative input terminal of the amplifier;
  the second electrical contact is connected to an output terminal of the amplifier; and
  the control signal is obtained from the output terminal of the amplifier.

8. The apparatus of claim 3, wherein the control signal adjustment module comprises a current source, an analog-to-digital converter (ADC), a set of switches, a set of registers, a computation module, and a digital-to-analog converter (DAC);
  wherein the control signal adjustment module is configured to:
    control the set of switches to connect the one or more connection structures of the each micro-mirror assembly to the current source sequentially to generate a voltage;
    control the ADC to digitize the voltages;
    store the digitized voltages at the set of registers to create a voltage map that maps the digitized voltages to the array of micro-mirror assemblies;
    control the computation module to compute, based on the voltage map and the first signal, the control signals in digital form for the actuators of the array of micro-mirror assemblies;
    generate the control signals in analog form from the digital forms using the DAC; and
    transmit the control signals in analog form to the actuators.

9. The apparatus of claim 8, wherein the control signal adjustment module is configured to generate the voltage map in a calibration process before the array of micro-mirror assemblies receive the light.

10. A method comprising:
  determining a target rotation angle for each micro-mirror assembly of an array of micro-mirror assemblies to set a target direction of at least one of: a projection path of output light from a light source, or an input path of input light to be received by a receiver;
  for the each micro-mirror assembly, generating a control signal for an actuator of the each micro-mirror assembly based on the target rotation angle and a spring stiffness of one or more connection structures of the array of micro-mirror assemblies; and
  transmitting the control signal to the actuator of the each micro-mirror assembly to rotate the micro-mirror of the each micro-mirror assembly by the target rotation angle, to perform at least one of: reflecting the output light of the light source along the projection path towards an object, or reflecting the input light propagating along the input path to the receiver, wherein the one or more connection structures is configured such that one dimension of the connection structure primarily contributes to the spring stiffness of the connection structure in comparison to other dimensions of the connection structure; and wherein the control signal is generated based on an electrical resistance related to the one dimension of the one or more connection structures.

11. The method of claim 10, further comprising:

receiving an input signal corresponding to the target rotation angle; and scaling, by an amplifier, the input signal based on a ratio between the electrical resistance and a reference resistance representing a nominal spring stiffness of the one or more connection structures to generate the control signal.

12. The method of claim 11, further comprising:

passing the input signal through two electrical contacts positioned on the one or more connection structure to the amplifier to perform the scaling.

13. The method of claim 11, further comprising:

passing the input signal through a resistor having the reference resistance to the amplifier to perform the scaling.

14. The method of claim 10, further comprising:

measuring the electrical resistance using an analog-to-digital converter to generate a measurement result;

receiving an input signal in digital format corresponding to the target rotation angle;

scaling the input signal in digital format based on the measurement result; and generating, using a digital-to-analog converter and based on the scaled input signal in digital format, the control signal.

15. The method of claim 14, further comprising:

measuring the electrical resistance of the one or more connection structures of the each micro-mirror assembly to generate a set of measurement results;

storing the set of measurement results in a register; and generating the control signal for the each micro-micro assembly based on the set of measurement results in the register.

* * * * *